April 21, 1959
R. D. SAGE
2,883,145
VALVE FOR USE WITH RADIOACTIVE FLUIDS
Filed May 10, 1956
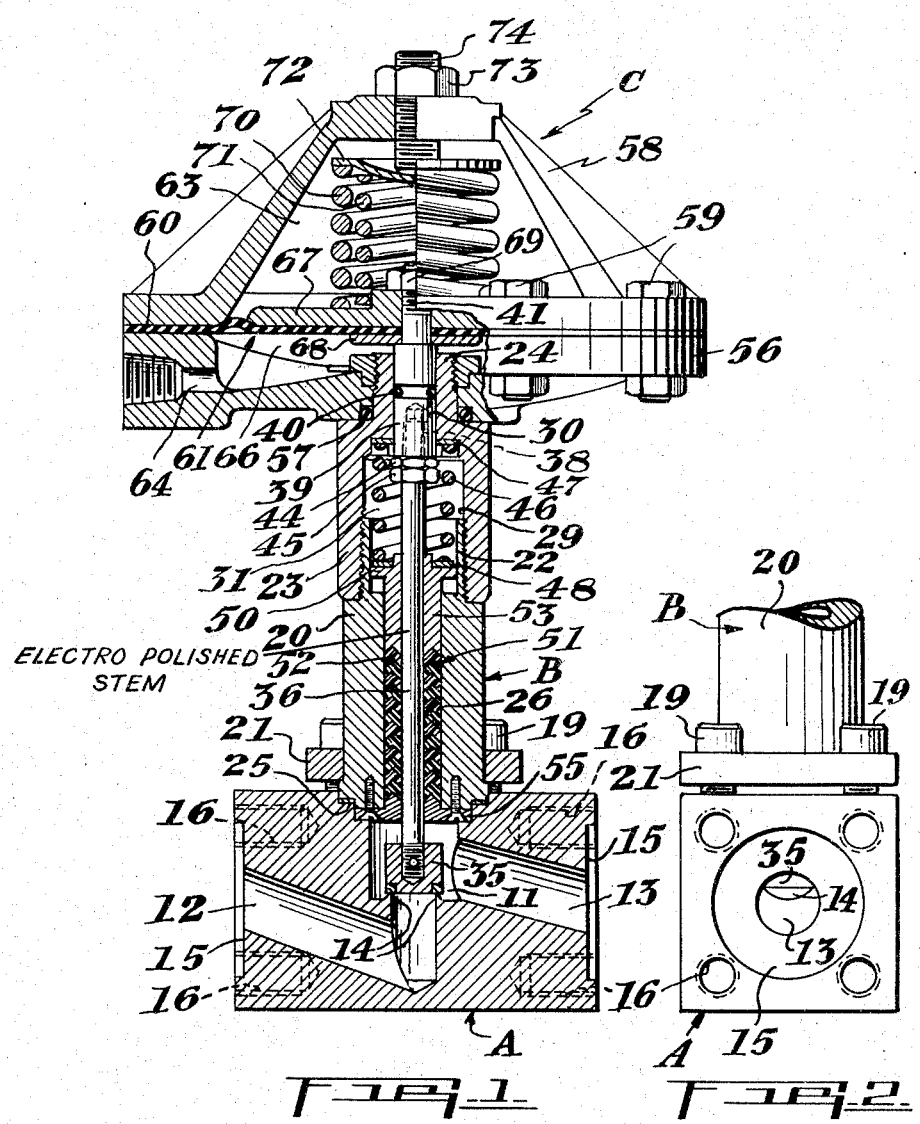
INVENTOR
ROY D. SAGE
BY Smart + Biggar
ATTORNEYS.

United States Patent Office 2,883,145
Patented Apr. 21, 1959

---

2,883,145

VALVE FOR USE WITH RADIOACTIVE FLUIDS

Roy D. Sage, Deep River, Ontario, Canada, assignor to Atomic Energy of Canada Limited, Ontario, Canada Application May 10, 1956, Serial No. 584,123

1 Claim. (Cl. 251—61)

The present invention relates to valves which are to be used in apparatus and pipelines through which radioactive fluids are to be passed.

Limited use of conventional valves has previously been made in highly radioactive service, but their use has had to be avoided wherever possible since there is a great possibility of leakage both internal and external and the maintenance of the valves is extremely difficult in active areas. Conventional valves, even those of high quality, are therefore useless for highly radioactive work. A leakage permissible in valves when used in steam or non-radioactive pressure liquid lines would dangerously contaminate the valve and surrounding area were such leakage permitted with highly radioactive fluids.

It is an object of the present invention to provide a valve which has a dependable positive stem seal and which is also resistant to corrosive conditions when encountered.

It is a further object of the present invention to provide a valve in which undesirable leakage is avoided even with the presence of metal cuttings and other foreign bodies in the process streams passing therethrough.

According to the present invention a valve comprises a valve body, a valve chamber therein, fluid inlet and outlet conduits thereto, a valve seating within the valve chamber between the inlet and outlet conduits, valve means adapted selectively to engage the seating, an electro-polished valve stem being connected to the valve means which stem is surrounded by a spring loaded packing.

Other objects of the invention will become apparent from a reading of the following specification taken in conjunction with the drawings in which:

Figure 1 is an elevation of a valve partly in section showing the spring-loaded packing and electro-polished stem according to the present invention, and Figure 2 is a part end-elevation.

Referring now to Figure 1, the valve generally comprises a valve body A, an extension B accommodating the valve stem, and fluid pressure operated means C for operating the stem. The valve body A has a valve chamber 11 therein, with inlet and outlet conduits 12 and 13 leading thereto and a valve-seating 14 located between the inlet and outlet conduits. The valve body ends 15 are machined to fit raised face flanges of radioactive fluid carrying conduits which are to be connected to the valve. Four threaded holes 16 are provided in each of the end faces 15 to receive set bolts whereby the conduits are secured to the valve. The valve body extension B extends upwardly from the valve body and is connected thereto by four set screws 19 (see Figure 2), a shoulder ring 25 being provided between the valve body and extension. The valve body extension B comprises two cylindrical members 20 and 23 screwed together. The cylindrical member 20 carries a flange 21 near its lower end to receive the set screws 19 for fixing purposes, and is provided with an axially extending bore 26. Near its upper end the member 20 has a tubular portion 22 which is externally screw threaded. The second cylindrical member 23 is provided with a recess 29 and an axial throughway 30 opening into the recess, the recess 29 being internally screw threaded for part of its length to receive the tubular portion 22. At its upper end 24 the member 23 is reduced in external diameter and is externally screw threaded. The recess 29 and tubular portion 22 combine to form a chamber 31 which houses a valve packing spring, to which reference is made hereinafter.

A valve closure member 35 seats on the valve seat 14 and thus closes off the inlet conduit 12 from the outlet conduit 13. The member 35 may be connected in conventional manner to a valve stem 36 and is adapted for longitudinal reciprocation therewith, towards and away from the seating 14. In accordance with this invention, the stem 36 is electro-polished so as to present an externally smooth surface. By treating the stem in this way, areas of the stem's surface which, under normal valve stem finishing, would hold minute quantities of the radioactive fluid passing through the valve, and carry them into the valve packing (hereafter described) are removed. Furthermore there will be much less tendency for the stem to score the packing and thus the formation of radioactive solution carrying channels in the packing will be avoided. The upper end 38 of the electro-polished stem 36 is screw threaded and screws into a stem extension 39, located in the throughway 30. A pair of jam nuts 44, 45 on the threaded portion of the stem 36 lock the stem and stem extension 39 together. The stem extension 39 has an annular recess 40 in its external surface, into which recess a neoprene O ring is fitted.

A spring 46 is located within the chamber 31 and is maintained in a state of compression between a washer 47 at the upper end of the chamber 31, and a washer 48 which abuts against a shoulder 50 of a packing member generally designated 51. The packing member 51, which extends downwardly from the chamber 31 through the bore 26 in the cylindrical member 20, comprises a series of chevron rings 52 and a piston like member 53 which carries the shoulder 50 near its upper end. The piston like member 53 and chevron rings are formed with an internal throughway to pass the electro-polished stem 36. Pressure from the spring 46 is transmitted downwardly through the washer 48, the shoulder 50, and the piston 53 to the chevron rings 52 which are compressed against a second shoulder ring 55 attached to the member 20 and acting as a seal between the valve body A and its extension B. The packing member 51 is therefore under constant spring pressure throughout its life.

These chevron packing rings are preferably made from a plastic consisting of a tetrafluoroethylene polymer such as sold under the registered trademark Teflon, and have a self-sealing tendency actuated by the solution pressure in the valve body. It is believed that the multiple chevrons allow the progressive taking over of the sealing action by the more remote rings as the adjacent rings to the piston like member 53 wear.

The fluid pressure operated means C for operating the electro-polished stem 36 will now be described with reference to the rest of the valve.

A dished flange 56 rests on a shoulder formed at the top of the cylindrical member 23 and surrounds the upper end 24 of the member 23, an O ring 57 being provided between flange and the end 24. A conical spider member 58 is secured to the flange 56 by bolts 59 so that the outer periphery 60 of a valve operating diaphragm 61 is held between flange and spider member with its centre portion free to move up into the interior 63 of the spider member. A fluid inlet conduit 64 is provided in the flange 56 to introduce fluid under pressure into a chamber 66 formed between the flange 56 and the underside of the diaphragm 61. The center of the diaphragm is engaged by a button 67 on its upper side and a diaphragm disc 68 on its underside, a nut 69 mating with a screw threaded portion 41 of the stem extension 39 and bearing on the button 67, locks the button 67, diaphragm 61, diaphragm disc 68 and stem extension 39 together, so that movement of the diaphragm 61 is transmitted to the electro-polished stem 36. The diaphragm is spring loaded by two springs 70 and 71 which are compressed by a spring button 72 adjusted by a nut 73 on an adjusting screw 74. Tightening of the nut 73 pushes the adjusting screw 74 through the spider ring 58 so that it engages the button 72 and compresses the springs 70, 71 thereby loading the diaphragm button 67 and hence the diaphragm 61. When fluid under pressure is admitted through conduit 64 it acts against the underside of the diaphragm 61 and raises it against the action of the springs 70 and 71 thus lifting the electro polished stem 36 and the valve member 35 from the seating 14 to allow radioactive fluid to pass from the inlet 12 through the valve chamber 11 and out of the outlet conduit 13. When the pressure fluid is cut off from the conduit 64 the valve member 15 is returned by the action of springs 70 and 71 to its seating 14 thus closing off the inlet and outlet conduits from each other.

The applicant has found that by using the spring loaded packing in combination with an electro-polished valve stem a hitherto unexpected result was obtained, and that valves constructed in accordance with the present invention have indicated leakage rates of the order of one drop per fifty years.

While but one form of the invention has been shown and described herein, it will be readily apparent to those skilled in the art that many minor modifications may be made without departing from the spirit of the invention or the scope of the appended claim.

What I claim as my invention is:

In a valve comprising a valve body, a valve chamber therein, fluid inlet and outlet conduits thereto, a valve seating within the chamber, valve means selectively adapted to engage the seating and thereby seal off the inlet conduit from the valve chamber; a valve body extension comprising a pair of cylindrical members secured together, and an outwardly extending flange on one of the cylindrical members; sealing means between the valve body and valve body extension, an electro-polished valve stem connected to the valve means and extending at least partially through the valve body extension, means engaging the electro-polished stem to move it towards and away from the valve seating, chevron packing means surrounding the electro-polished stem, spring means within the valve body extension engaging the packing means and spring loading it into operative position, and screw members engaging the said flange and valve body to secure them together.

References Cited in the file of this patent

UNITED STATES PATENTS

| | | |
|---|---|---|
| 2,541,176 | Rockwell | Feb. 13, 1951 |
| 2,647,538 | Demay | Aug. 4, 1953 |
| 2,665,711 | Parks | Jan. 12, 1954 |